United States Patent [19]

Weier

[11] Patent Number: 4,852,846
[45] Date of Patent: Aug. 1, 1989

[54] METHOD AND APPARATUS OF A CONVENTIONAL FORE AND AFT VEHICLE SEAT ADJUSTER CONVERTIBLE INTO AN EASY ENTRY SEAT ADJUSTER SLIDE

[75] Inventor: Mark D. Weier, Mt. Clemens, Mich.

[73] Assignee: General Motors Corporation, Detroit, Mich.

[21] Appl. No.: 93,356

[22] Filed: Sep. 4, 1987

[51] Int. Cl.⁴ .............................................. B60N 1/04
[52] U.S. Cl. .................................... 248/430; 297/341
[58] Field of Search ............... 248/429, 430; 297/341; 296/65 R, 65 A

[56] References Cited

U.S. PATENT DOCUMENTS

| | | | |
|---|---|---|---|
| 3,940,182 | 2/1976 | Tamura | 297/341 |
| 4,065,178 | 12/1977 | Carella et al. | 297/341 |
| 4,101,169 | 7/1978 | Muraishi et al. | 297/341 |
| 4,143,911 | 3/1979 | Sakakibara et al. | 297/341 |
| 4,423,904 | 1/1984 | Crawford | 297/341 |
| 4,440,442 | 4/1984 | Drouillard et al. | 297/341 |
| 4,449,752 | 5/1984 | Yasumatsu et al. | 297/341 |
| 4,621,867 | 11/1986 | Perring et al. | 248/429 X |
| 4,671,571 | 6/1987 | Gionet | 248/429 X |

Primary Examiner—Blair M. Johnson
Attorney, Agent, or Firm—Ernest E. Helms

[57] ABSTRACT

The present invention provides a conventional fore and aft vehicle seat adjuster which can be quickly converted to an easy entry seat adjuster which a memory. The present invention is highly useful when utilized for the front seat in two door vehicles wherein the bending of the front seat back forward allows the front seat to move to its most foward position. After utilization of the easy entry feature, pushing back on the front seat will automatically return the front seat in its prior preselected position without further adjustment by the front seat occupant.

2 Claims, 2 Drawing Sheets

METHOD AND APPARATUS OF A CONVENTIONAL FORE AND AFT VEHICLE SEAT ADJUSTER CONVERTIBLE INTO AN EASY ENTRY SEAT ADJUSTER SLIDE

FIELD OF THE PRESENT INVENTION

The present invention relates to vehicle seat adjuster (slides). Additionally, the present invention relates to vehicle seat adjuster (slides) having an easy entry feature wherein by a signal the seat is automatically positioned to an extreme forward or rearward position to facilitate entry or exit of the vehicle. More particularly the present invention relates to easy entry seat adjuster (slides) as hereintofore described wherein the slide also has a memory to return the seat to its preselected adjusted position without further adjustment by the seat occupant. Still more particularly the present invention relates to a conventional seat adjuster (slide) that the above noted features and adjuster slides which are ideally suited for such applications.

DISCLOSURE STATEMENT

Typically automotive vehicles have a front and rear row of seating. It is common to provide automotive vehicles with just one door per side (two door vehicle) wherein the front and rear seat occupants utilize the same door to enter or exit the vehicle. To allow the rear seat occupant to enter the vehicle, the front seat back pivots forward to provide a greater opening. To increase the room for entry into the vehicle further, the tilting of the front seat back also activates a biasing force to move the front seat to an extreme forward position. After the rear seat occupant is seated, the front seat back is returned to its upright position. It is then desirable for the front seat to return to the prior preselected position by being pushed back by the front seat occupant without requiring the front seat occupant to readjust the seat.

Examples of easy entry vehicle seat adjuster slides may be found in commonly assigned U.S. Pat. Nos. 3,853,373, Corbett; 4,065,178, Carella; and 4,422,690, Kopich.

The present invention provides an easy entry vehicle seat adjuster slide which provides an alternative to the adjuster slides noted above and further shows a simple conversion of a conventional seat adjuster (slide) to an adjuster (slide) including the above notes features.

It is an object of the present invention to provide a manual easy entry vehicle seat adjuster with memory for selectively adjusting a vehicle seat to a plurality of positions with respect to the vehicle and for returning the seat to the prior selected position upon utilization of the east entry feature, the adjuster in combination including, a lower channel means for connection with the vehicle, the lower channel having engagement means along a portion of the length of the lower channel, an upper channel means connected with the seat and slidably mounted on the lower channel, a first latch means connected with the upper channel for selectively contacting with the lower channel engagement means for affixing the upper channel on the lower channel in a manually activated handle means to operate the first latch, an easy entry activator means to move the first latch independently of the handle, and a quick connect plate for mounting on the lower channel for covering and preventing contact of the first latch with a portion of the engagement means, and the plate having a second latch means whereby the second latch being biased to connect the plate with the lower channel and the second latch being moved by the handle and the plate having means of contact with the upper channel when the handle moves the second latch so that the plate moves with the upper channel when the position of the seat is being selectively adjusted with respect to the vehicle and the second latch retaining the plate in a fixed position with respect to the lower channel when the easy entry activator moves the first latch thereby preventing the first latch from contacting the lower channel engagement means except at the prior selected position.

Other objects, desires and advantages of the present invention will become more apparent to those skilled in the art as the nature of the invention is better understood from the accompanying drawings in a detailed description.

DETAILED DESCRIPTION OF THE DRAWINGS

Figure 1:
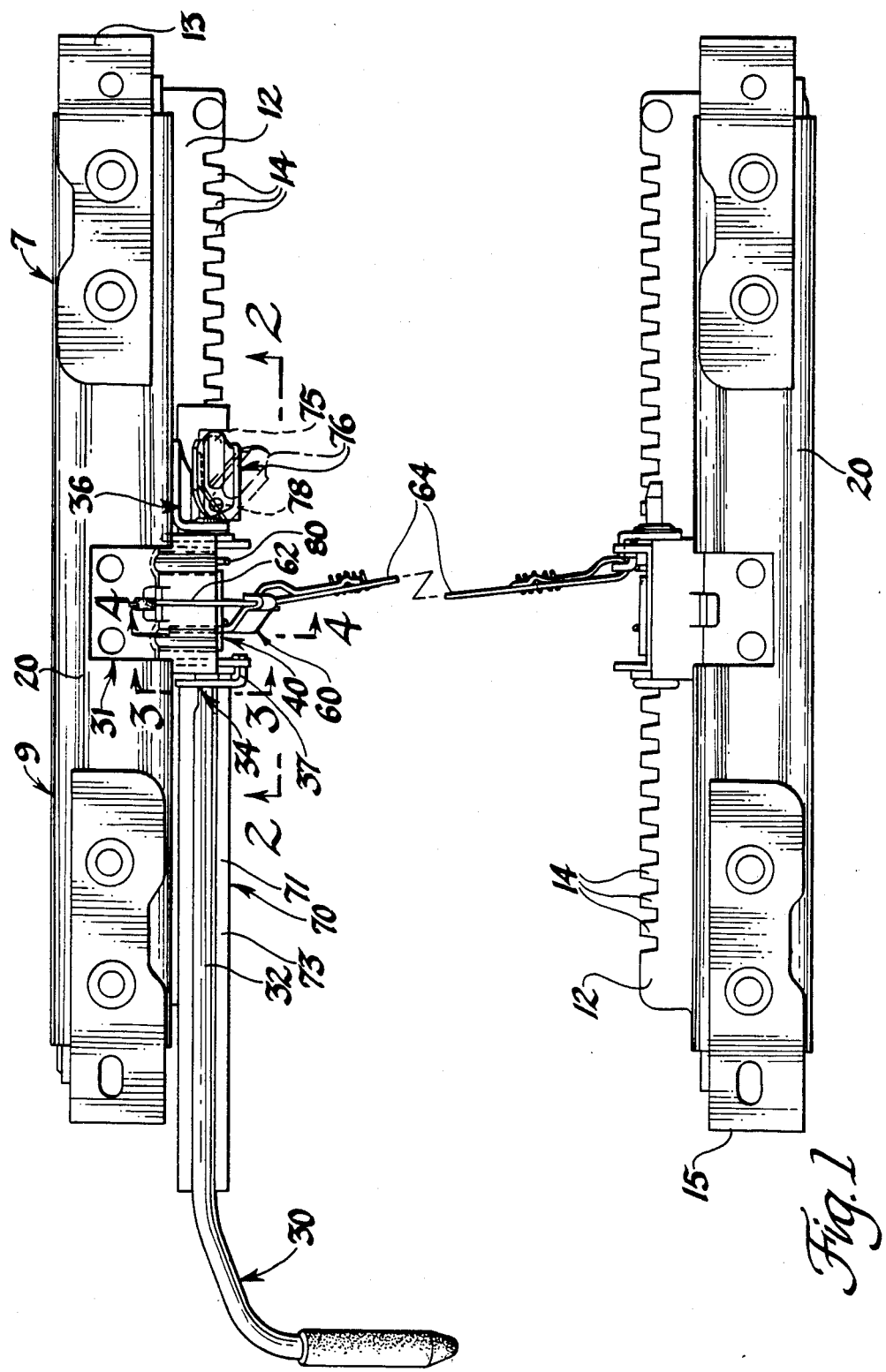
FIG. 1 is a top plan view of the present invention.
Figure 2:
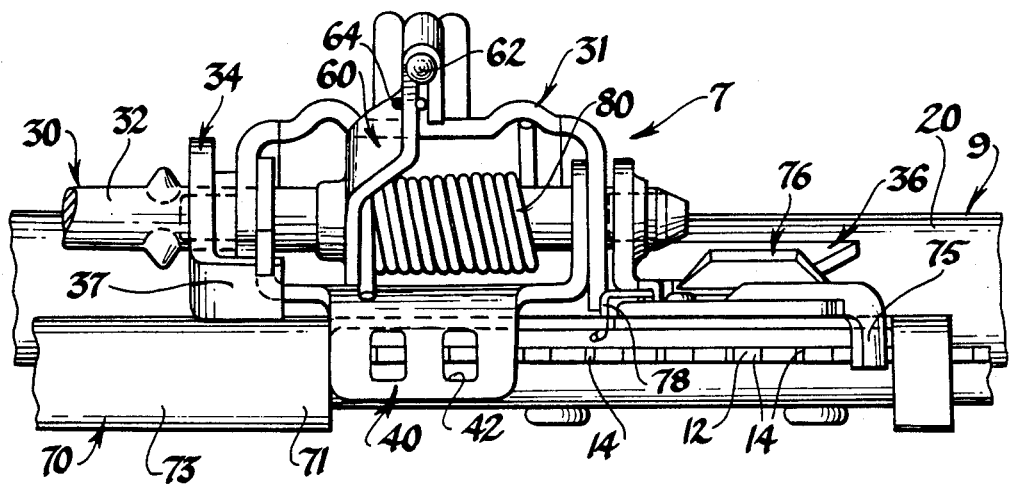
FIGS. 2, 3 and 4 are views taken along lines 2—2, 3—3 and 4—4 respectively.

Referring to FIGS. 1, 2, 3 and 4, the easy entry memory seat adjuster 7 and seat adjuster slide 9 of the present invention is fixably connected to the vehicle via a plate or rail commonly referred to as the floor or lower channel means 10. The lower channel 10 has what is commonly referred to as a lock plate 12 integrally formed or boltably attached thereto. The lock plate along a significant portion of its length has engagement means provided by a series of notches 14.

Slidably mounted on top of the lower channel 10 is a seat channel 20 referred to as the upper channel or upper channel means. The upper channel 20 means of connection to the vehicle seat, the upper channel is slidably mounted to the lower channel by a series of upper left and right and lower left and right bearing balls 25. The lower channel on both sides has a flange which separates the upper and lower balls from one another. The upper channel has a hook portion which allows the upper and lower channels to be interlocked.

The outboard adjuster slide is provided with a manually activated handle means 30 which is connected with the upper channel 20. Handle means 30 has a rod 32 rotatively mounted in lock bar mounting bracket 31 which is in turn fixably connected to upper seat channel 20. The handle means has a D shaped section on the rod 32 onto which the lock bar actuator 34 is keyed to having a D shaped hole. In like manner the handle means 30 has a scoop 36 attached on a D shaped section. A first latch means or lock bar 40 is provided for affixing the position of the upper channel with the lower channel.

Lock bar 40 is connected with upper channel 20 via a free pivotal connection on rod 32 and selectively contacts aperatures 42 with notches 14 to set the position of the upper channel 20 or seat with respect to the lower channel 10 or vehicle.

Crank 60 is freely pivotally connected on rod 32. Crank 60 is also connected with cable 62. Cable 62 is in turn connected with the seat back on easy entry latch (not shown). Crank 60 is also connected with a cable 64 which operates the lock bar on the inboard or slave adjuster slide 15.

A joined two piece quick connect plate 70 with a slot 72 is slidably mounted on said lock plate 12 and covers a portion of notches 14. The outer piece 71 is usually made of a hardened heat treated steel. Biased by spring 78 and pivotally mounted on the plate is a second latch means of memory marker 76. The memory marker has a tab 75 which engages with notches 14 to retain the plate 70 with the lower channel 10.

Figure 3:
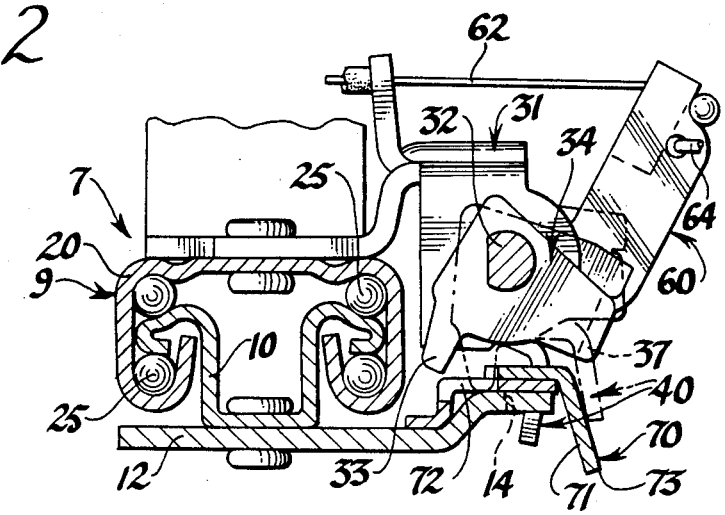
Figure 4:
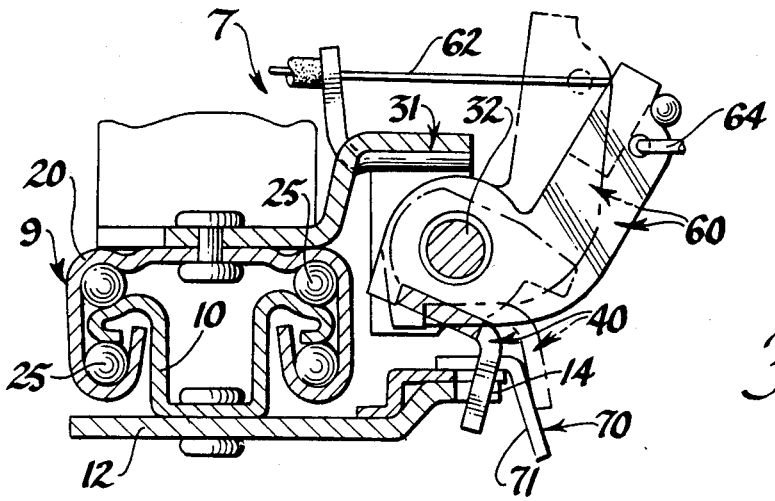

In operation spring 80 biases lock bar 40 to an engaged position. Handle means 30 is biased by spring 80 via lock bar 40 and lock bar actuator 34 to its non actuated position. In similar fashion, a spring biases a lock bar on the inboard adjuster slide 15 to a similar engaged position. To adjust the seat in normal operation, the seat occupant operates handle 30. The turning of handle 30 causes the lock bar actuator 34 along portion 37 to contact block bar 40 and move it from the solid line position to the phantom position of FIG. 3 to release the apertures from engagement with notches 14. Movement of lock bar 40 (counter clockwise as seen in FIGS. 3 and 4) causes the crank 60 to move counterclockwise after the lock bar 40 contacts crank 60 thereby pulling cable 64. The pull of cable 64 releases the lock bar of the inboard slider 15 from its respective lock plate. The scoop 36 moves the memory marker 76 to a position shown in phantom in FIG. 1 releasing tab 75 from notches 14. Lock bar actuator tab 33 is also inserted within the slot 72 and becomes a means of contact between the lower channel 10 and the plate 70. The lower channel 10 and plate 70 are new free to move together to the next selected adjusted position.

To use the easy entry feature, the cable 62 is pulled to the left (as shown in FIG. 4) by a seal latch or by the bending of a pivotal back seat (not shown). Crank 60 will rotate counterclockwise causing the lock bar 40 to release from engagement and pulling on the cable 64 to release the lock bar of the inboard slider 15.

Since the crank 60 is freely pivotal on rod 32 the handle means 30 will not be turned. Therefore the lock bar actuator tab 33 will not be inserted into slot 72 and memory marker tab 75 will not be disengaged from notches 14. Therefore plate 70 is now fixed with respect to lower channel 10. A spring (not shown) will urge the seat towards the front or bend end of handle means 30. The lock bar 40 will continue to be held out of engagement by a blank portion 23 of plate 70. Also cable 64 will still be tensioned and the lock bar of the inboard adjuster 15 will still be held out of engagement.

To return the seat to the prior selected position, the seat is pushed back until the lock bar 40 slides off the blank portion 73. Spring 80 will then urge the lock bar 40 back into engagement at the prior selected position and cause the crank 60 to be pulled back counterclockwise. The above also causes cable 64 to be pulled back to lock the lock bar of the inboard adjuster 15.

The above design provides a great advantage in that to convert a conventional seat adjuster to an easy entry adjuster the only additional parts required are cable 64, scoop 36, plate 70 with its spring biased memory marker 76. If desired to provide uniformity in large production, handle means 30 will be the same for all vehicles. If a four-door model car is produced plate 70, cable 64 and its memory marker 72 will be deleted. If production plans call for a two-door vehicle, slide 62 will be added and the plate 70 with it memory marker 72 will be added to convert the adjuster to an easy entry seat adjuster. Therefore, a custom design for the easy entry seat adjuster is no longer required.

Due to forming requirements to achieve the surface hardness desired it is usually preferable to make the quick place out of a two piece member allowing a harder heat treated steel to be formed over the portion which slides onto the lock bar.

While an embodiment of the present invention has been explained, it will be readily apparent to those skilled in the art of the various modifications which can be made to the present invention without departing from the spirit and scope of this application as it is encompassed by the following claims.

I claim:

1. A manual easy entry vehicle seat adjuster with memory for selectively adjusting a vehicle seat to a plurality of positions with respect to said vehicle and for returning said seat to a prior selected position upon utilization of said easy entry feature, said adjuster in combination comprising:

a lower channel for connection with said vehicle, said lower channel having engagement means along a portion of the length of said lower channel;

an upper channel connected with said seat and slidably mounted on said lower channel;

a first latch connected with said upper channel for selectively contacting with said lower channel engagement means for affixing said upper channel on said lower channel;

a manually activated handle to operate said first latch and said handle having a tab;

an easy entry activator to move said first latch independently of said handle; and a quick connect plate mounted on said lower channel for covering and preventing contact of said first latch with a portion of said engagement means, and said plate having a second latch whereby said second latch being biased to connect said plate with said lower channel and said second latch being moved contemporaneously with said first latch by said handle and said plate having a slot for reception of said tabe for contact with said tab when said handle moves said first latch so that said plate moves with said upper channel when the position of said seat is being selectively adjusted with respect to said vehicle and said second latch retaining said plate in a fixed position with respect to said lower channel when said easy entry activator moves said first latch thereby preventing said first latch from contacting said lower channel engagement means except at said prior selected position.

2. A seat adjuster slide as described in claim 1 wherein said handle pivots in an axis generally parallel with said lower channel and said handle at one end has a scoop, said second latch has a memory marker pivotal in an axis generally perpendicular to said lower channel with a tab for engagement with said engagement means, and rotation of said handle causes said scoop to move said memory marker to remove said tab from engagement with said engagement means.

* * * * *

UNITED STATES PATENT AND TRADEMARK OFFICE
CERTIFICATE OF CORRECTION

PATENT NO.   : 4,852,846
DATED        : August 1, 1989
INVENTOR(S)  : Mark D. Weier, Regis V. Pilarski, Antonio P. Centi It is certified that error appears in the above-identified patent and that said Letters Patent is hereby corrected as shown below:

Item [19] should read --Weier, et al--

Title page Inventor should read after "Mark D. Weier, Mt. Clemens, insert -- Regis V. Pilarski, Utica; Antonio P. Centi, Riverview -- after, and before the abbreviation "Mich" insert the words -- all of --.

In the Abstract line 3, "with", should read -- which --.

Column 3, line 42, after the numeral "70", insert -- (added to Figure 4 for clarity of illustration) --.

Column 3, line 46, numeral "23", should read -- 73 --.

Column 3, lines 53 and 54, "counterclockwise" should read -- clockwise --.

Column 3, lines 58 and 62, numeral "64", should read -- 62 --.

Column 3, line 63, numeral "72", should read -- 76 --.

Column 3, line 64, "slide", should read -- cable --.

Column 4, line 1, numeral "72", should read -- 76 --.

Column 4, line 7, "place", should read -- connect plate --.

Column 4, line 9, "bar", should read -- plate --.

Column 4, line 45, (Claim 1, line 28 "tabe", should read -- tab --.

Column 3, lines 29-30, both occurrences, "lower channel 10" should read -- upper channel 20 --.

Column 3, line 33, "seal" should read -- seat --.

Signed and Sealed this

Thirtieth Day of October, 1990

Attest:

HARRY F. MANBECK, JR.

*Attesting Officer*      *Commissioner of Patents and Trademarks*